Aug. 23, 1960 R. J. HOLTON 2,949,627
FRICTION HINGE
Filed Feb. 25, 1957
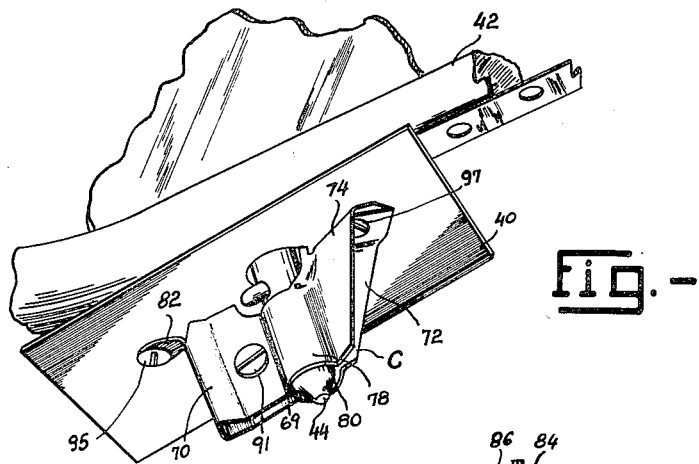
Fig.-1
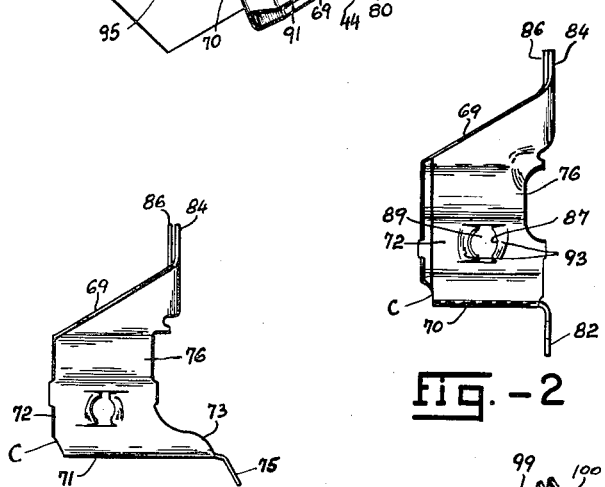
Fig.-2
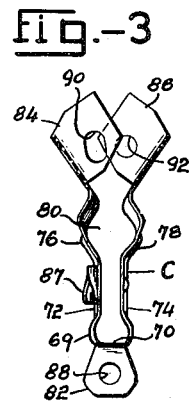
Fig.-3
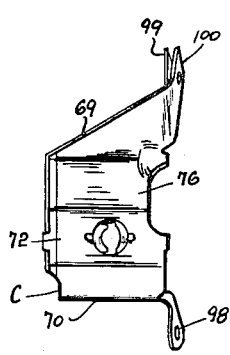
Fig.-5
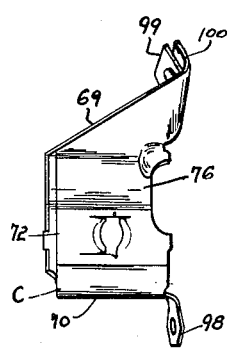
Fig.-7
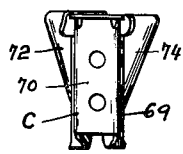
Fig.-4
Fig.-6
INVENTOR.
ROBERT J. HOLTON
BY
Bates, Teare & McBean
ATTORNEYS United States Patent Office 2,949,627
Patented Aug. 23, 1960

2,949,627

FRICTION HINGE

Robert J. Holton, Cleveland, Ohio, assignor to Tinnerman Products Inc., Cleveland, Ohio, a corporation of Ohio Filed Feb. 25, 1957, Ser. No. 642,098

4 Claims. (Cl. 16—140)

This invention relates to fastening devices for rotatably retaining a shaft or the like, and more particularly to fastening devices for securing the swivel post of a car window vent frame.

Most types of car window vents are rotatably secured in position in the car door frame by means of hinge-type, friction fastening devices in which oppositely disposed swivel posts on the window vent frame are rotatably secured. Most fastening devices of this type consist of a number of individual parts are complicated in design and require considerable time on the part of a skilled mechanic to assemble the same.

An object of the present invention is to provide a fastening device for rotatably mounting a car window vent that is simple in construction, contains a minimum number of parts, and which may be quickly and easily installed in position.

Briefly, the foregoing object may be accomplished by the provision of a fastening device for rotatably mounting a car window vent frame or the like comprising a substantially U-shaped spring clip having oppositely disposed semi-cylindrical projections located intermediate the legs or arms of the U to form a socket for receiving the swivel post of a car window vent frame. The clip may have mounting brackets formed on one side thereof and integral therewith. The mounting brackets may take the form of apertured lugs disposed on one side of the base of the U-clip in addition to apertured lugs disposed on the same side of the clip at each of the free ends of the arms. The clip may be mounted by enclosing the same around a car window vent frame swivel post whereby the swivel post is enclosed in the clip socket, after which the lug formed on the base of the U may be secured to the car door frame by any convenient means, such as a bolt or stud. Next, the legs of the U may be drawn together in resilient-like fashion until the apertures in the lugs at the free ends of the arms coincide with each other, at which time a stud or bolt may be passed through the apertures and secured to the door frame. In this manner, the arms of the U-shaped clip are held in tight engagement around the swivel post in a manner whereby the swivel post is frictionally rotatable within the clip socket.

With such a fastening device, there is provided a simple and efficient means whereby a car window vent frame may be quickly and simply mounted on a car door frame.

Other objects and advantages of the invention will be apparent from the following description taken in conjunction with the drawings in which:

Figure 1 is a perspective view of an application using the fastening device of the invention and retaining the swivel post of a car door window vent frame;

Figure 2 is a side elevational view of the fastening device shown in Figure 1;

Figure 3 is a bottom plan view of the fastening device shown in Figure 1;

Figure 4 is an end elevational view of the device shown in Figure 1;

Figure 5 is a side elevational view of a modified form of the fastening device shown in Figure 1;

Figure 6 is a side elevational view of another modification of the fastening device shown in Figure 1;

Figure 7 is a side elevational view of a still further modification of the fastening device shown in Figure 1.

Although the fastening device is described herein with reference to rotatably mounting a car door vent window frame in position on a car door, the device may be used wherever a shaft or like structure is to be rotatably mounted.

Referring now again to the drawings, the device or clip C includes a substantially U-shaped clip 69 comprising a base portion 70 having substantially identical, parallel arms 72 and 74 extending in one direction therefrom. This construction permits the arms 72 and 74 to be resiliently displaceable toward and away from each other to a limited extent. Disposed intermediate the arms there is formed the semi-cylindrical hump portions or projections 76 and 78 on the arms 72 and 74, respectively, said projections co-acting to form a socket 80, which is adapted to frictionally receive a shaft 44 or the like therein. Extending from the base portion 70 at right-angles thereto from one side of the clip is a mounting lug or bracket 82, by means of which the fastening device C may be secured to a panel 40 or similar object. In the embodiment illustrated in Fig. 1, the panel 40 is attached to a car door frame on which is rotatably supported a window vent frame 42, with the swivel shaft 44 secured to the vent frame 42 and extending downwardly therefrom. Additionally, each of the free ends of the arms 72 and 74 have the mounting brackets or lugs 84 and 86 thereon respectively, which are formed integral therewith on the same side of the fastening device as the base mounting lug 82. Each of the lugs 82, 84 and 86 have the openings 88, 90 and 92 formed substantially centrally therein respectively, which are adapted to receive a screw or stud or the like, by means of which the clip 69 may be mounted on a panel or similar object.

When the resilient arms 72 and 74 are in their normal or untensioned position, as shown in Figure 3, the openings 90 and 92 therein respectively, are not in axial alignment. However, when the fastening device C is in mounted position, the arms 72 and 74 are drawn together in a manner allowing the socket 80 to enclose and frictionally engage the swivel post 44 (Figure 1), and additionally allowing the openings 90 and 92 in the lugs 84 and 86 respectively, to align themselves axially to permit the insertion of a stud or screw 97 or the like therethrough by means of which the clip 69 may be mounted on a panel or frame in conjunction with the base mounting lug 82.

A typical application of the fastening device C is shown in Figure 1. The device may be mounted by placing the same over and around the window vent swivel post 44 and securing the base portion 70 of the clip by means of the screw 95 in the lug 82. At this point, the swivel post 44 is disposed in the socket 80 by a very loose fit. Next the resilient arms 72 and 74 are drawn toward each other until the openings 90 and 92 in the mounting lugs 84 and 86 respectively are in axial alignment, at which time a stud 97 may be inserted therethrough and secured to the panel, thereby completing the installation of the fastening device. Oppositely disposed openings 87 and 89 are provided in the arms 72 and 74 between the base 70 and the socket 80 for receiving the stud 91 by means of which the arms are additionally held in closed position. At least one of the openings may have tongues 93 for engaging the threads of the stud 91. Once the fastening device has been secured in position as afore-described, the shaft 44 is secured in the socket 80 by a substantially tight fit, yet not tight enough to prevent restrained rotation of the shaft. With this structure, the window vent may be rotated to any position and held in such position by virtue of the friction-tight fit of the joint formed by the shaft 44 in the socket 80.

A modification of the clip C is shown in Figure 5 wherein the base portion 71 thereof has an outward extension 73 thereon containing the mounting lug 75 which extends from the base at an oblique angle. This particular structure is necessitated in certain applications where the car door contour at the point where the clip is to be fastened curves off sharply.

Figures 6 and 7 show still further modifications of the clip C. The clip shown in Figure 6 may be used on the left door of a car, while the clip shown in Figure 7 may be used on the right door of a car. In this respect, it will be noted that the mounting lugs 98, 99 and 100 thereon are bent obliquely in a different manner in each figure, to accommodate the contour on the respective right or left-hand door as the case may be.

Although the invention has been described in connection with a car door vent window, it will be understood that the invention may be used wherever a shaft or the like is to be rotatably mounted in a manner allowing the shaft to be firmly held in place no matter what angular position said shaft may be placed with respect to the fastening device.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a fastening device for embracing a swivel shaft of a vent window frame and the like, mounted on a support, to support the swivel shaft in frictional rotatable relation therewith, comprising, a one-piece sheet metal clip bent intermediately into a generally U-shaped configuration defining a base portion and a pair of resilient arm portions, said device comprising a back marginal edge and a front marginal edge, each of said arm portions being disposed in confronting relation with respect to the other arm portion, each of said arm portions being deformed outwardly intermediate its ends and generally transverse of the respective arm portion, said deformed portions being oppositely disposed and coacting to form a socket for rotatably receiving the swivel shaft therein, each of said arm portions having a tab disposed at the free end thereof, adjacent said back marginal edge, said tabs being disposed in planes extending generally transverse to the lengthwise axis of said socket, each of said tabs comprising an aperture therethrough, said arm portions being adapted for movement toward one another against their spring-like resistance to deformation for frictionally embracing the swivel shaft when the latter is in said socket, whereby said tabs will be disposed in overlapping relation with said apertures therethrough generally axially aligned, for receiving a cooperating fastening element to attach said device to the support.

2. In a fastening device in accordance with claim 1, wherein said base portion adjacent said back marginal edge comprises an apertured mounting tab projecting outwardly therefrom and disposed in a plane extending generally transverse to the lengthwise axis of said socket.

3. In a fastening device in accordance with claim 1, wherein each of said arm portions is provided with an opening therethrough disposed intermediate said base portion and said deformed section of the respective arm portion, said openings being generally axially aligned, one of said openings including means adjacent its periphery adapted for adjustably gripping threads on an associated threaded fastener, such as a headed screw, adapted to extend through said openings, for adjusting the frictional embracing coaction between said arm portions and the swivel shaft when the latter is disposed in said socket.

4. In a fastening device in accordance with claim 1, wherein said tabs are contoured to generally conform with the surface of the support to which the device is adapted for attachment.

References Cited in the file of this patent

UNITED STATES PATENTS

| | | |
|---|---|---|
| 383,468 | Jones et al. | May 29, 1888 |
| 413,891 | Berkey | Oct. 29, 1889 |
| 645,218 | Roche | Mar. 13, 1900 |
| 2,555,053 | Myrick et al. | May 29, 1951 |
| 2,582,420 | Ellis | Jan. 15, 1952 |